United States Patent

[11] 3,578,955

[72] Inventor Gerald P. Kloven
 White Bear Lake, Minn.
[21] Appl. No. 713,758
[22] Filed Mar. 18, 1968
[45] Patented May 18, 1971
[73] Assignee Ramsey Engineering Company
 St. Paul, Minn.

[54] TOTALIZER FOR INTEGRATING THE PRODUCT OF TWO VARIABLES WITH DIGITAL REGISTRATION
 15 Claims, 10 Drawing Figs.

[52] U.S. Cl. .................................................. 235/92,
 235/183, 340/347
[51] Int. Cl. ....................................................... H03k 25/02
[50] Field of Search ............................................ 235/92
 (59), (29W), 183, 150.51; 340/347

[56] References Cited
 UNITED STATES PATENTS
 2,950,052  8/1960  Knox .......................... 340/347
 3,104,318  9/1963  Hill et al. ...................... 235/183
 3,168,658  2/1965  Marshall ........................ 340/347
 3,489,885  1/1970  Kintner ......................... 235/92
 FOREIGN PATENTS
 1,020,845  2/1966  Great Britain ................. 340/347

Primary Examiner—Maynard R. Wilbur
Assistant Examiner—Joseph M. Thesz, Jr.
Attorney—Dugger, Peterson, Johnson & Westman

ABSTRACT: A capacitor is charged with a DC current obtained from a voltage signal that is proportional to a first variable, such as the weight of material on a prescribed section of a conveyor belt. Each time that the accumulated charge on the capacitor reaches a specific level, the capacitor is automatically discharged to provide an output pulse. The repetition rate or frequency of these pulses is proportional to the signal voltage and hence the magnitude of the first variable. By causing these pulses, or a percentage of such pulses, to flow to a pulse counter, the count registered during the period of pulse flow will indicate the time integral of the first variable, and in the conveyor case the amount of conveyed material when the belt is moving at a constant speed.

However, where the integral is influenced by another process variable, such as a variance in the conveyor belt speed, the count that is registered will not be an accurate indication of the total material discharged from the conveyor. Provision is made for modifying the number of pulses reaching the counter so that the total pulse count will reflect therein the variable belt speed. By way of an AC signal having a frequency proportional to the conveyor speed and circuitry controlled thereby, the current for charging the capacitor is alternately directed to the capacitor for a first period and then diverted from the capacitor for a second period. Means are employed for retaining the accumulated charge on the capacitor during each second period. In this way, pulses flow to the counter only during successive first periods and no pulses flow during successive second periods. By making the ratio of pulse flow time to total time, that is, the ratio of each first period to the sum of that first period and the following second period, proportional to the magnitude of the second variable, which is the belt speed in the illustrated situation, the counter registration then indicates the product of the two variables. In other words, there is produced a speed integral in which the counter registration denotes the quantity of material discharged from the conveyor even through both the rate of material and the belt speed vary.

The capacitor is discharged many times each second. Pulse-divider circuitry accurately divides this high pulse rate down to a more usable range, thereby utilizing the above-mentioned percentage of pulses. A rate member is included and provision is made for providing a coarse zero and fine zero setting to indicate both zero rate on the meter and a zero counting rate on the counter for the condition of either (or both) the magnitude of the DC voltage or the frequency of the AC signal being zero. By means of a span adjustment a wide range in magnitudes of the DC input signal can be made to represent full scale on the rate meter.

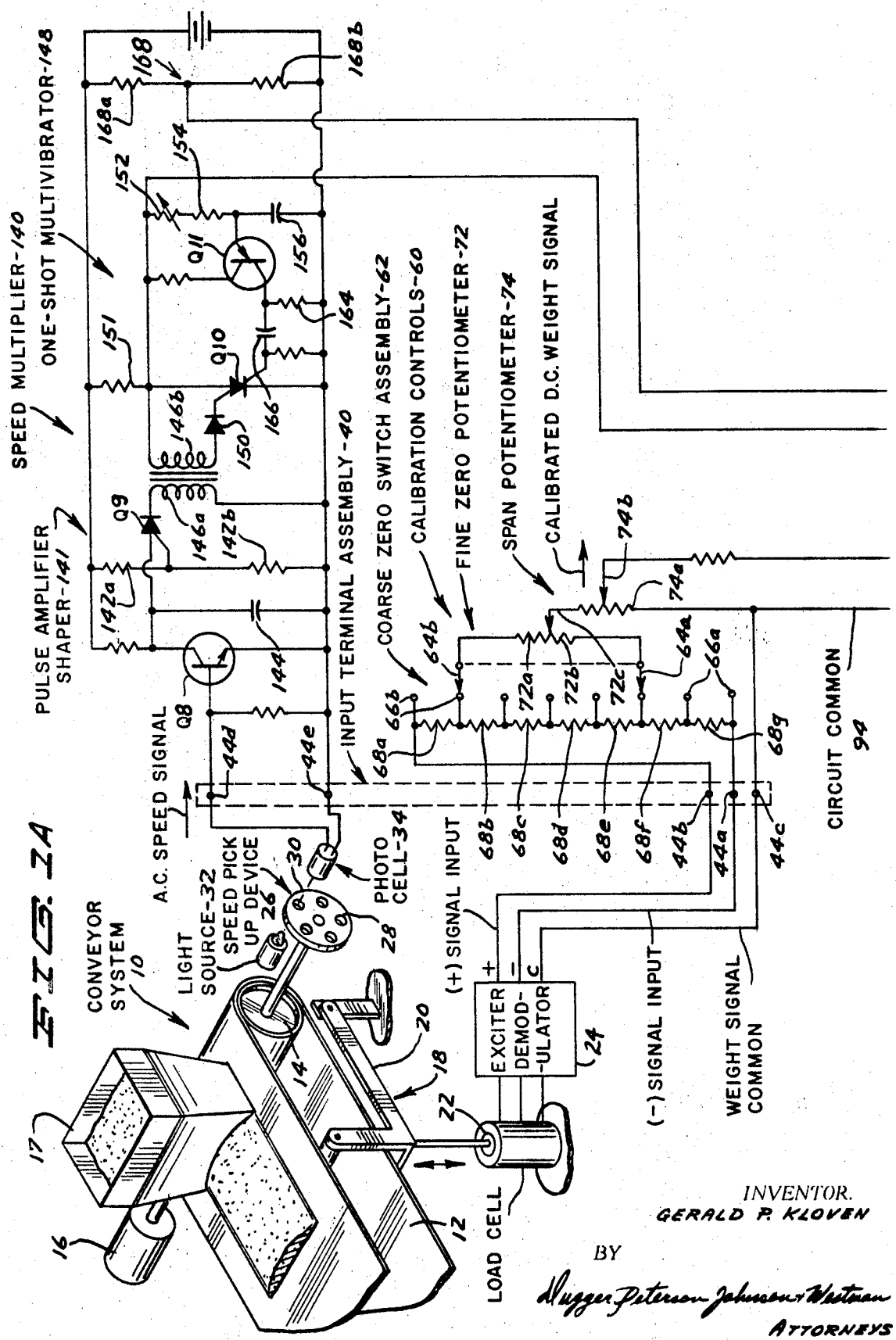
Patented May 18, 1971
3,578,955
3 Sheets-Sheet 1
INVENTOR.
GERALD P. KLOVEN
BY
Dugger, Peterson, Johnson & Westman
ATTORNEYS Patented May 18, 1971

INVENTOR.
GERALD P. KLOVEN

BY

Dugger Peterson Johnson + Westman

ATTORNEYS

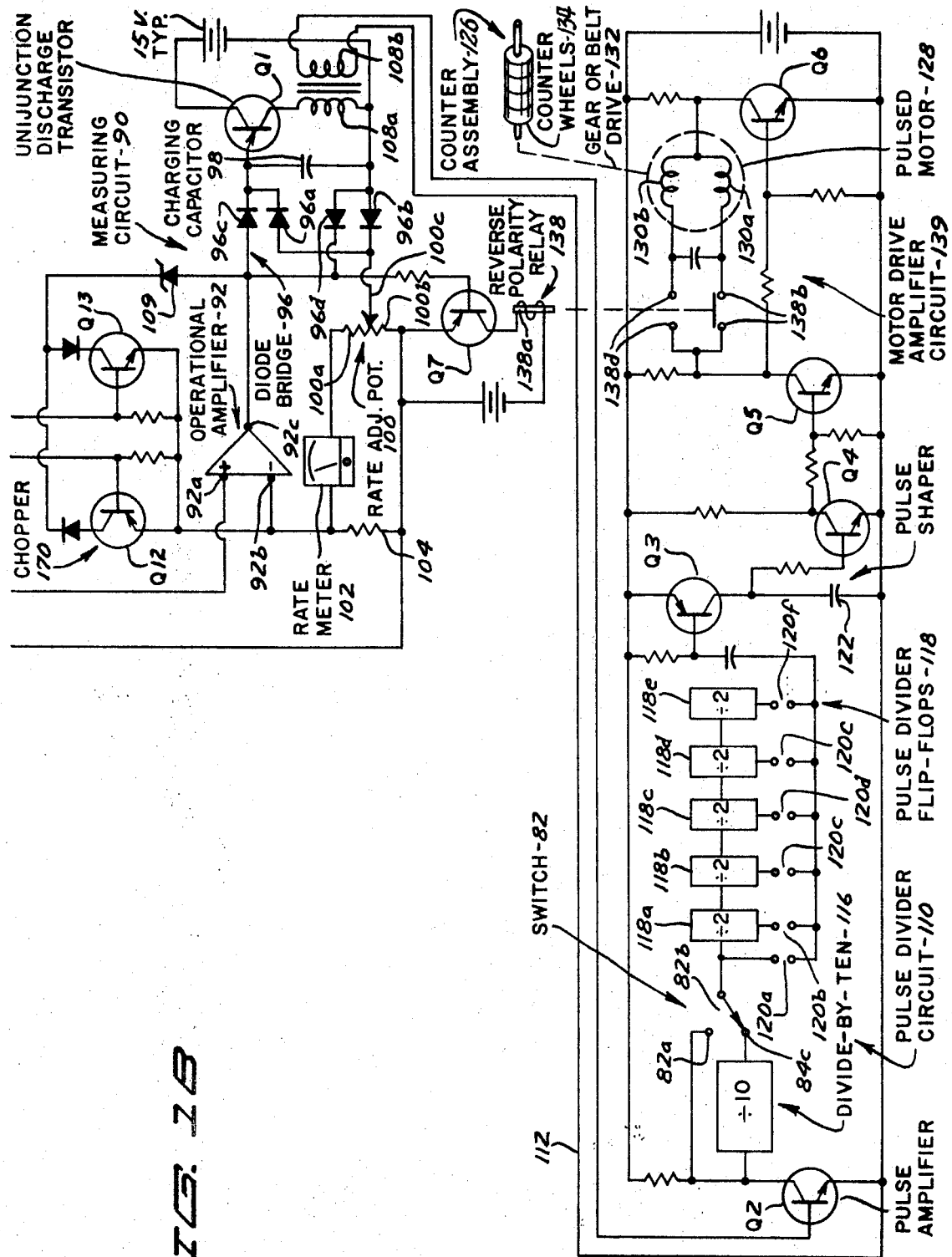

3,578,955

TOTALIZER FOR INTEGRATING THE PRODUCT OF TWO VARIABLES WITH DIGITAL REGISTRATION

BACKGROUND OF THE INVENTION

1. Field of the Invention

This invention relates generally to integrating circuits, and pertains more particularly to means for generating a number of pulses such that the pulse count represents the product of two variables, either or both varying in magnitude with respect to time.

2. Description of the Prior Art

Totalizers per se are old and well known. However, the totalizers with which I am familiar provide a registration of a product of two variables but such totalizers are wither of the analog type throughout the entire signal processing circuitry or there is an analog-to-digital conversion after an analog multiplication. Such totalizers are not completely accurate. The relative inaccuracy stems from their inability to accept and handle small input signals. Also, they do not possess good linearity and stability. Further, they do not have a wide range of count rate adjustments and the method involved in calibrating the count rate is usually tedious and complex. Many prior art arrangements do not totalize both negative and positive signals.

SUMMARY OF THE INVENTION

Accordingly, an object of the present invention is to provide a totalizer that either obviates or minimizes the shortcomings of the prior art devices with which I am acquainted, particularly with respect to their inaccuracy and lack of versatility.

Briefly stated, my invention includes a measuring circuit that accepts a DC input signal having a magnitude proportional to one process variable, the measuring circuit converting the input signal to a train of pulses having a repetition rate accurately reflecting the magnitude of the input signal. When a second variable is also involved, a multiplication is achieved by stopping the flow of pulses for certain periods of time so that the product of the two variables is indicated in both the rate indication and the total number of pulses counted. Since a large number of pulses per unit time is desirable in order to enhance the precision capabilities of a totalizer herein described, pulse dividing circuitry is employed so that electromechanical counting means may be employed and if desired located at a remote vantage point. Provision is made for producing a zero registration when either of said variables falls to zero.

BRIEF DESCRIPTION OF THE DRAWINGS

FIG. 1 is composed of two separate sheets designated FIGS. 1A and 1B and collectively constitute a schematic diagram exemplifying my invention when FIG. 1A is placed above FIG. 1B, and FIGS. 2A—2H illustrate certain typical waveforms that will aid in understanding my invention.

Figure 2A:
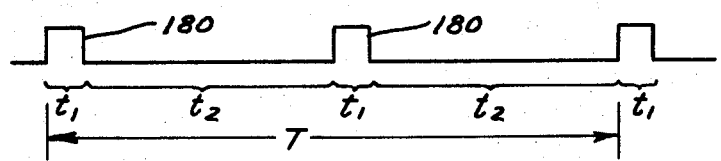

DESCRIPTION OF THE PREFERRED EMBODIMENT a. Conveyor

While adaptable for use in any industrial quantity measurement function which requires precision, the present invention is especially suited for use in systems which may be subject to wide variations in flow rate. An accurate sum or count is provided in systems subject to arbitrary rate variations, as in systems influenced by public or customer demands, systems subject to reverse flow, as in the measurement of interchange of energy between electric utility networks, and random variations, as in conveyor belts for the movement of bulk material. For the sake of illustrating the invention, the latter application has been selected.

Accordingly, typical conveying apparatus has been depicted and has been denoted generally by the reference numeral 10. It will be seen that the apparatus 10 includes a flexible belt 12, this belt being only fragmentarily pictured. The belt 12 is entrained about a drive pulley 14 which is powered by an electric motor 16. A hopper 17 is surmounted above the belt 12 and it is from this hopper that the material to be conveyed is deposited on the belt 12. Actually, the material that is delivered to the belt 12 is delivered at a nonuniform rate in many instances, although the presence of the hopper 17 would indicate a constant delivery rate. However, it is where the rate of delivery varies, perhaps quite widely, that my invention will find particular usefulness.

In order to provide a signal in accordance with the weight of the material as it is delivered to the belt 12, a weight scale 18 is utilized. The scale 18 comprises a load cell which in its simplest form constitutes a load beam 20 and a differential transformer 22, which is controlled by a suitable exciter and demodulator 24. The output from the differential transformer 22, owing to the particular position of its movable core as influenced by the load beam 20, provides the instantaneous DC voltage signal that is representative of the instantaneous load or weight on the scale 18.

To illustrate the versatility and the benefits to be derived from a practicing of my invention, it will further be assumed that the speed of the conveyor 10, more specifically the belt 12, fluctuates. Thus, the variable rate at which the material is deposited from the hopper 17 constitutes one process variable and the variance in the speed of the belt 12 constitutes a second process variable.

Therefore, a speed pickup device has been denoted generally by the reference numeral 26. This device can assume various forms but in the pictured instance it includes a disc 28 that is rotated in unison with the drive pulley 14. It will be observed that the disc has a number of angularly spaced openings or apertures 30 therein. By means of a lamp 32 light is directed through the apertures 30 onto a photocell 34, the light being allowed to impinge upon the photocell each time that an aperture 30 is moved into position between the lamp 32 and the photocell 34. Hence, a series or stream of electric pulses are generated by way of the photocell 34, the frequency of which is in accordance with the particular speed of the pulley 14 and therefore the belt 12.

b. Input Terminal Assembly

The input terminal assembly as shown in FIG. 1A has been given the reference numeral 40. The assembly 40 includes a number of terminals 44 therein. More specifically, it will be observed that those terminals labeled 44a, 44b, and 44c are connected to the scale 18. Similarly the terminals 44d and 44e are connected to the speed pickup device 26.

c. Power Supply

While the entire circuitry of this invention is fed from stepdown power transformers and suitable rectifier circuits, it is felt that nothing is lost in the ensuing description, by omission of the actual power supply circuits. To simplify the circuit drawings, the power supplies are shown simply as DC battery supplies.

d. Calibration Controls

The calibration controls are referred to in their entirety by the reference numeral 60. The calibration controls comprise a coarse zero switch assembly 62, a fine zero potentiometer 72, and a span potentiometer 74. It is the purpose of the calibration controls 60 to modify the relative and absolute magnitudes of the signals derived from the scale system in a manner which will cause the following circuits to indicate a meaningful and suitably calibrated output.

The DC signals which are representative of belt loading are fed from input terminals 44a, 44b, and 44c to what will be termed a coarse zero switch 62 having a lower selector arm 64a and an upper selector arm 64b. The lower selector arm 64a is engageable with any of a number of contacts 66a whereas the upper selector arm 64b is similarly engageable with any number of contacts 66b. The contacts 66a and 66b have therebetween a number of resistors 68a, 68b, 68c, 68d and 68e, 68f, and 68g. The selector arms 64a and 64b are fixedly connected to each other in such manner that they move together, so that the proportion of the total resistance 68a, 68b, 68d, 68f, and 68g, is always constant. By switching the selector arms 68a and 68b to a suitable position, a condition of approximate balance can be achieved; that is, the selector arm 68a will be negative, and the selector arm 68b will be positive. This condition can be achieved regardless of the degree of loading on the scale 18.

The DC signal appearing on the selector arms 68a and 68b is placed across what will be called a fine zero potentiometer 72 having resistance portions 72a, 72b and a wiper arm 72c. It will be appreciated that for the condition of selector arm 66a negative and selector arm 66b positive, a unique position of the wiper 72c will result in zero voltage on the wiper 72c relative to the signal common on terminal 44c. This corresponds to "Tare;" that is, the weight of the belt 12 and scale members without any load, that is, material on the belt 12.

It should be pointed out that as the weight of material on the scale 18 is increased, the positive signal on terminal 44b increases, while the negative signal at terminal 44a, decreases. It should therefore be evident that following the proper positioning of the coarse zero switch 62 and fine zero potentiometer 72 to arrive at a "Tare" condition; that is, zero signal at the wiper 72c with no material upon the belt 12, the voltage at the wiper 72c will become positive in proportion to any additional load borne by the scale 18.

The heretofore described signal is placed across the entire resistance 74a of the span potentiometer 74, whose wiper arm 74b may be positioned to select any desired proportion of said signal so that the magnitude of the signal at the wiper 74b causes the hereinafter described circuitry to indicate the weight of material upon the scale at the correct level of calibration.

e. Measuring Circuit

The measuring circuit has been designated generally by the reference numeral 90. It is of importance to note that an operational amplifier 92 is provided in this circuit, the amplifier having a noninverting input terminal 92a, and inverting input terminal 92b, and an output terminal 92c. The amplifier 92, which should be highly stable, is used as a millivolt-to-milliamp converter. The voltage output at the terminal 92c varies as a function of the difference in voltage applied to the input terminals 92a, 92b. The amplifier 92, when connected in the manner shown, responds such that it will attempt to keep the voltage difference between its input terminals 92a, 92b at virtually zero.

The ultimate role of the measuring circuit 90 is to supply a train of pulses whose repetition rate is exactly proportional to the signal voltage derived from the scale 18. The input terminal 92a of the amplifier 92 connects with the wiper arm 74b of the span control potentiometer 74 so that the heretofore described DC signal is applied to the noninverting input terminal 92a.

Assuming for the moment that the input signal to the amplifier 92 is positive, a positive output current flows from the terminal 92c through the diode 96c to the capacitor 98 and then through the diode 96b to the wiper 100c of the rate adjust potentiometer 100. The current then divides, one portion flowing through the resistive section 100a, the rate meter 102, through the feedback resistor 104 and thence to the circuit common 94, and a second portion through the resistive section 100b to circuit common 94. The amplifier 92 provides the requisite amount of current through the resistor 104, for all intents and purposes, to produce a zero voltage difference between the terminals 92a and 92b. It should be evident, therefore, that the current out of the amplifier terminal 92c is in direct proportion to the voltage at the input terminal 92a relative to the circuit common 94.

On the other hand, when the input signal for the amplifier 92 is negative, the charging path to the capacitor 98 is through the diodes 96d and 96a. The capacitor 98, in this way, is always charged in the same direction irrespective of the polarity of the amplifier output current.

One side of the capacitor 98 is connected to the emitter of a unijunction transistor Q1. The base-one of the unijunction transistor Q1 is connected to one side of the primary winding 108a of a pulse transformer 108. The emitter and the base-one of the transistor Q1, together with the primary winding 108a, constitute a discharge path for the capacitor 98. What occurs is that the output current from the amplifier 92 charges the capacitor 98 in a linear fashion so that a positive-going voltage ramp appears across the capacitor 98 which is sampled by the unijunction transistor Q1. The transistor Q1 serves as a threshold device which simultaneously discharges the capacitor 98 and provides a rapid pulse of current into the primary winding 108a of the transformer 108. In other words, the combination of the operational amplifier, the 15 capacitor 98 and the unijunction transistor Q1 constitutes a voltage-to-frequency converter.

The pulse transformer 108 has a secondary winding 108b and each time that the unijunction transistor Q1 conducts, which conduction discharges the capacitor 98, there is a flux change as far as the primary winding 108a of the pulse transformer 108. This is reflected in the secondary winding 108b with the consequence that there is an output pulse from the pulse transformer 108. If the capacitor 98 is charged rapidly and this rapid charge rate is continued at successive intervals, then the pulse repetition rate will be quite high. On the other hand, if the capacitor 98 is charged slowly, then it reaches the threshold level of the transistor Q1 less frequently, and the pulse repetition rate or frequency will be lower. The secondary winding 108b is connected to provide a pulse input to the pulse amplifier Q2, which in turn feeds the pulse divider circuitry 110 described below.

f. Pulse Divider Circuit

A pulse divider circuit has been indicated generally by the reference 110, and as its name implies it receives the various pulses from the measuring circuit 90, lowering the frequency of these pulses to a rate compatible with the capability of an electromechanical device yet to be referred to. The pulse divider circuit 110 also performs an amplifying function necessary to drive or operate the electromechanical device. There is a common conductor labeled 112 which is connected to the previously mentioned side of the secondary winding 108b of the pulse transformer 108. It has already been mentioned that the other side of the secondary winding 108b of the pulse transformer 108 is connected to the base of transistor Q2 which functions as a pulse amplifier. It is the output from the transistor Q2 that enters what will be termed a "divide by ten" counter designated generally by the reference numeral which is composed of four flip-flops connected in a fashion which causes the counter 116 to supply an output frequency that is exactly one-tenth of the frequency of the pulses delivered to the counter from the transistor Q2.

The output from the "divide by ten" counter 116 is fed to the contact 84d of the X10 switch 82. When the selector arm 82b is in its normal position, that is in engagement with the contact 84c, the output of the counter 116 is fed to a pulse divider means designated generally by the reference numeral 118, being composed of five flip-flops 118a, 118b, 118c, 118d and 118e, each being capable of dividing the input frequency thereto by precisely two. In order to select the particular frequency, though, a number of select screws 120a, 120b, 120c, 120d, 120e and 120f are utilized. It will be perceived that the select screw 120a is connected directly to the input of the first flip-flop 118a so as to bypass all of the flip-flops constituting the pulse divider means 118 when the select screw has been inserted at this point. Stated somewhat differently and more fully, if a screw is placed at 120a, the selected output frequency will be in the ratio of 1:1, at 120b at 1:2, at 120c 1:4, at 120d 1:8, at 120e at 1:16 and if at 120f then 1:32, when compared to the input frequency. When the selector arm 82b is placed in contact with 82a, the "divide-ty-ten" counter 116 is effectively bypassed, resulting in a frequency input to the pulse divider flip-flops 118 which is ten times as great as normal, thus the "X10" nomenclature, to indicate that the output pulses will be effectively multiplied by a factor of ten. This feature is of great value during calibration procedures and when dealing with very low signal levels, since it effectively "expands" the measuring rate by a factor of 10.

The output from the pulse divider means 118, this output having whatever frequency has been selected by reason the various select screws 120a—f, is fed as an input to a pulse shaper 121 comprising transistor Q3 which, along with capacitor 122 and transistor Q4, provides a pulse of known width and amplitude regardless of incoming frequency. The shaped pulse is then fed to a motor drive amplifier circuit 139 consisting of Q5 and Q6 which provide sufficient amplification to run the yet to be referred to electromagnetic device constituting a counting motor.

g. Counter Assembly

Having mentioned the counting device, it will be well to describe the counter assembly which has been assigned the reference numeral 126. The counter assembly 126 includes a totalizer motor 128 having a forward winding 130a and a reverse winding 130b. The totalizer motor 128 responds to each pulse delivered thereto; ten pulses are required to turn the least significant of the counting wheels 134, one revolution or ten counts, doing so through the gear or belt drive 132.

h. Reverse Polarity Relay Circuit

In describing the motor 128 of the counter assembly 126, the reverse winding 130b has been mentioned. Consequently, when the incoming DC voltage signal is below the zero set point, this being particularly likely to happen in certain environmental situations, the totalizer motor 128 must turn the counter wheels 134 backwards. To do this, a reverse polarity relay 138 is provided having a pickup coil 138a, a pair of normally closed contacts 138b, as well as a pair of normally open contacts 138d. However, the contacts 138b, it will be discerned, are in series with the forward winding 130a of the counter motor 128, whereas the contacts 138d are in series with the reverse winding 130b of this motor. When the relay 138 is energized, then the pulses from the motor pulse amplifier circuit 139 which comprises the transistors Q5 and Q6 will be applied to the reverse winding 130b of the motor 28, whereas when the relay 138 remains deenergized then the pulses are impressed on the forward winding 130a.

To understand how the relay 138 is energized, it will be well to revert back to the amplifier 92 of the measuring circuit 90. As long as its input terminal 92a is more positive than the defined zero set-point, there will be a positive output from the terminal 92c. When the situation is reversed, that is the terminal 92a becomes negative, then the output from the amplifier via the terminal 92c will be negative.

Assuming first that the output signal at the terminal 92c is positive, this will appear as a positive input at the base of a transistor Q7. Because the transistor Q7 is a PNP type, a positive voltage applied to its base will not cause it to conduct. On the other hand, when the input signal to the amplifier 92 goes negative, causing the output from the amplifier to go negative, the negative voltage is sensed at the base of the transistor Q7, causing it to conduct. When the transistor Q7 conducts, current is supplied to the pickup coil 138a of the reverse polarity relay 138 with the result that the pulses from the pulse divider circuit 110 will be transmitted to the reverse winding 130b of the motor 128 so that it is driven backwards and the registration reflected by the counting wheels 134 will be reduced rather than increased as is the situation when the forward winding 130a is energized. It will be obvious that the windings 130a and 130b are energized through the agency of the contacts 138b or 138d depending upon which of these contacts are closed, the contacts 138d being closed only when the signal to the amplifier 92 is negative as described above.

i. Speed Multiplier Circuit

The speed multiplier circuit, which has been given the reference numeral 140, is employed in conjunction with the previously mentioned measuring circuit 90 in a way such that the frequency signal to the speed multiplier is caused to react with the current in the measuring circuit. This results in an output from the measuring circuit that is the product of the DC input signal multiplied by the AC frequency of the speed rate signal. A wide range of adjustability is possible with the speed multiplier circuit so that virtually any input speed from the belt speed pickup 26 can be accommodated.

Describing now in detail the speed multiplier circuit 140, it will first be repeated that the input to the speed multiplier circuit consists of the AC signal derived from the speed pickup device 26 whose frequency is proportional to the the speed at which the conveyor belt 12 is operated, this being so because of the mechanical coupling of the apertured disc 28 to the drive pulley 14. Included in a pulse amplifier-shaper circuit 141 is transistor Q8 which serves to amplify the signal from the photocell 34 and imparts a known configuration to the resulting wave shape. Having its anode connected to the collector of the transistor Q8 is a silicon controlled switch Q9 possessing the property or characteristic that it will not conduct from its anode to cathode unless the anode is more positive than the potential applied to its gate. Through the agency of a voltage divider consisting of resistors 142a and 142b, approximately 12 volts in practice are impressed on the gate of the switch Q9. It will be observed that a capacitor 144 is connected across the transistor Q8, more specifically connected to the collector at one side thereof and to the emitter at the other side. It will be appreciated that the voltage on the capacitor 144 rises or increases as a result of an incoming pulse from the speed pickup device 26. This voltage eventually exceeds the aforementioned conduction criterion and the switch Q9 is rendered freely conductive, discharging the capacitor 144 through a pulse transformer 146, more specifically, through its primary winding 146a so that an output pulse is delivered from its secondary winding 146b. The switch Q9 has the property that it will continue to conduct providing a source of current is available from its anode to its cathode. This condition prevails for the duration of the conduction until the speed pickup pulse reverses polarity. It should be explained that the capacitor 144 is discharged very rapidly and will not recharge until the switch Q9 stops conducting. Consequently, a single pulse is made available to the pulse transformer 146 for every cycle of the AC input signal obtained from the speed pickup device 26 and therefore an output pulse is obtained from this transformer only when the pulse is delivered thereto. Thus, it is the discharge of the capacitor 144 that results in a pulse output from the secondary winding 144b.

Referring now to the circuitry connected to the secondary winding 146b of the pulse transformer 146, it will be appreciated that this circuitry includes a one-shot multivibrator 148 having a precisely known pulse width which will produce an output cycle in response to each trigger pulse that is fed thereinto. The cycle begins whenever a second silicon controlled switch Q10 is made to turn off, the switch Q10 conducting indefinitely until a positive pulse is forwarded from the secondary winding 146b of the pulse transformer 146. It will be observed that a diode 150 is positioned between the secondary winding 146b and the gate for the silicon controlled switch Q10; if a positive pulse passes through this diode 150 to the gate of the silicon controlled switch Q10, the gate voltage will momentarily exceed the anode voltage with the consequence that the switch abruptly stops conducting. A resistor 151 is connected between the positive power supply and the anode of the switch Q10. Consequently, when the switch ceases conduction there is then very little current through the resistor 151 and the voltage at the anode of the switch Q10, therefore, rises to almost 15 volts, assuming this to be the supply voltage.

It will be discerned that a charging path exists when the switch Q10 is not conducting, this path extending through a variable resistor 152 having one end connected to the juncture of the anode of the switch Q10 and the previously mentioned resistor 151, a resistor 154 and into a capacitor 156. The capacitor can be selected by some convenient means (not shown).

Influenced by the state of charge on the capacitor 156 is a unijunction transistor Q11 which has its emitter connected to one side of the capacitor 156. When the state of charge reaches the firing threshold of the unijunction transistor Q11, this transistor will discharge the capacitor 156 through a resistor 164, thereby causing a positive pulse to appear at the upper end of the resistor 164. A coupling capacitor 166 serves to trigger the switch Q10 into conduction due to the connection established via the capacitor 166 to the gate of the switch Q10. In this way, one cycle of the precision one-shot multivibrator 148 is completed. The resultant waveform at the juncture of the resistor 151 with the anode of the switch Q10 is a positive going square wave segment whose frequency is exactly the same as that of the speed pickup device 26 input, and whose width is controlled by the timing of the unijunction transistor Q11 and the RC circuitry associated therewith, the period being readily changeable, for instance, by adjusting the variable resistor 152.

A voltage divider 168 comprised of resistors 168a and 168b results in a positive voltage at their juncture, although less positive than that at the juncture of the resistor 151 with the anode of the switch Q10, this being in the absence of an input signal from the speed pickup device 26. At any rate, a current path prevails to a chopper designated generally by the reference numeral 170.

The chopper 170 includes a first transistor Q12 and a second transistor Q13. The base of the transistor Q13 is connected to the juncture of the resistors 168a and 168b constituting the voltage divider 168. The base of the transistor Q12 is connected to the juncture of the resistor 151 with the anode of the switch Q10. Since the voltage at the juncture between the resistor 151 and the anode of the switch Q10 is normally less than the voltage at the juncture of the resistors 168a and 168b, this being in the absence of a speed pickup input signal from the pickup device 26, a positive current path exists from the juncture between the resistors 168a and 168b, proceeding through the emitter-base junction of transistor Q13, into the emitter of transistor Q12, out of its base, and returning to the output of the multivibrator 148 which is at the juncture of the resistor 151 and the anode of the switch Q10. Since the emitter-base junctions of both of these transistors Q12 and Q13 are forwardly biased under these conditions, the transistors will conduct from their emitters to their collectors providing that the collectors are biased in the proper direction. This represents the normal condition of these two transistors Q12 and Q13 in the absence of a signal from the speed pickup device 26; that is, one or the other will be conducting provided that a voltage is present from emitter to collector.

On the other hand, during the interval that the one-shot multivibrator 148 is in its opposite state, this being when the switch Q10 is not conducting due to a pulse having been received from the speed pickup device 26, the current path from the juncture of the resistors 168a and 168b through the transistors Q12 and Q13 to the juncture of the resistor 151 and the anode of the switch Q10 does not exist. This is by reason of the fact that the voltage at the juncture between the resistor 151 and the anode of the switch Q10 is more positive than the voltage at the juncture of the resistors 168a and 168b, making the emitter-base junctions of the transistors Q12 and Q13 reverse biased. Since no current can flow through the emitter-base junctions of these transistors Q12 and Q13 under this set of conditions, the transistors are in their off or nonconductive state. This corresponds to the chopper 170 being turned off. Consequently, it can be seen that the chopper 170 will be normally conducting in the absence of a signal from the speed pickup device 26. Each single cycle from the speed pickup device 26 triggers the one-shot multivibrator 148 and the chopper 170 is switched from its conductive state to its nonconductive state, the duration of which is precisely timed by the multivibrator 148.

It is imperative that a full comprehension be had now as to the role performed by the chopper 170. Accordingly, attention is directed to the previously described measuring circuit 90. Momentarily assuming a positive current from the output terminal 92c of the amplifier 92 there exists a current path via diode 96c and into the capacitor 98 as previously described. However, when the chopper 170 is conducting, thus providing a low impedance current path through transistor Q13 from its collector to its emitter, there is an alternate path for the current from the amplifier 92 that would otherwise pass to the capacitor 98. This alternate course proceeds through the diode 109 to the collector of the transistor Q13 and then returns via the emitter thereof to the terminal 92b of the amplifier 92. It is therefore obvious, it is believed, that the current avoids the normal path to the capacitor 98 and therefore does not contribute to the charging of the capacitor 98 when the copper chopper 170 is conducting. Also, the same alternate path prevents current from passing through the rate meter 102 as part of the normal charging current would do because of the shunting effect of the rate adjust potentiometer 100. The measuring circuit under this state of affairs results in both a zero current to the capacitor 98 and a zero current through the rate meter 102.

If the diversion function performed by the chopper 170 in the paragraph above is considered to be in connection with the processing of a positive output signal from the amplifier 92, this being when the input terminal 92a is positive, the same description holds true for a negative signal except that the transistor Q12 provides the conductive path rather than the transistor Q13.

As previously mentioned, the diode bridge 96 performs an isolating function, the diodes 96b and 96c blocking any discharge of the capacitor 98 when the amplifier 92 has a positive output current flowing from its terminal 92c to the chopper 170 to thus bypass the capacitor 98 and when the polarity of the output current is reversed the diodes 96a and 96d retaining the charge on the capacitor at its accumulated level. It should be understood that the important information stored in the capacitor by virtue of its charge is preserved and that the charging continues from that specific level when the chopper 170 conduction period ends and current from the amplifier again is allowed to flow to the capacitor 98.

From the description of the role played by the chopper 170 it should now be manifest that the chopper 170 allows the measuring circuit 90 to operate for a fixed period of time once during each cycle of the AC input voltage. During the remainder of the cycle the measuring circuit contributes neither pulses out to the counting circuitry nor current to the rate meter 102. As the speed of the pickup device 26 is decreased, and hence the frequency of the incoming AC signal, this being representative of a decrease in the speed of the conveyor belt 12, the fixed periods that the measuring circuit is effective become less frequent, thereby reducing the number of times during a given interval that the capacitor 98 reaches the threshold level of charge and causes an output pulse to be produced via the unijunction transistor Q1 and the pulse transformer 108. When no AC input signal is supplied to the speed multiplier circuit 140, such as when the conveyor belt 12 stops, the chopper 170 causes the current from the amplifier 92 to bypass both the rate meter 102 and the capacitor 98. This results in a zero reading on the rate meter 102 and no pulses being fed to the counter assembly 126, thereby causing no registration as far as the counting wheels 134 are concerned. In other words, the number of pulses from the pulse transformer 108 during a total time, which includes both the charging period and the bypassing period, is representative of the magnitude of the DC signal multiplied by the frequency of the AC signal. Explained more fully, the AC signal from the speed pickup device 26 is first converted to a single electrical pulse for each cycle of incoming frequency. The pulse then initiates a timing period by reversing the state of the multivibrator 148, turning off the chopper 170. This allows the measuring circuit 90 to function normally so that the totalizing action, as is reflected in the counter assembly 126, is as it would be without the speed multiplier circuit 140. When the multivibrator 148 returns to its original state, then the chopper 170 becomes conductive so as to bypass current from the rate meter 102 and the integrating portion of the measuring circuit 90, more specifically the capacitor 98 and its associated unijunction transistor Q1, so that no output occurs during this period. Since the frequency of the speed pickup device 26 is normally rather high, the resultant intermittent current flow through the rate meter 102 and the intermittent pulse interruptions to the counter assembly 126 are virtually indiscernible, and both outputs appear smooth and continuous.

j. Operation

Having presented the foregoing description, certain portions of the operation will be understood from the information already given. It will be of assistance in appreciating the benefits to be derived from a practicing of the invention, however, to go into certain aspects of the operation in more detail so that the overall system will be completely understood.

With this in mind, the input DC signal voltage is introduced into the system from the scale 18 via the terminals 44a, 44b and 44c. The incoming DC signal fed into the system via the terminals 44a, 44b, 44c is directed to the coarse zero switch 62. Manipulation of the coarse zero switch 62 and the fine zero control potentiometer 72 permits a selection of a voltage for further processing which will be interpreted by the system as meaning zero. This type of adjustment is particularly advantageous in order to offset the tare or empty condition of the belt 12 of the conveyor 10. In other words, when the hopper 17 is feeding no material onto the belt, the rate meter 102 and counter assembly 126 should indicate a zero situation, the motor 128 simply receiving no pulses under these circumstances. The output of the fine zero control potentiometer 72 is applied to the top of the span potentiometer 74. Manipulation of the span potentiometer, it can be pointed out, allows for the attenuation of the DC signal to a level that renders it satisfactory as an input for amplifiers contained in the circuitry. The output of the span potentiometer 74, by reason of a conductor extending from its wiper 74b, is fed to the input terminal 92a of the operational amplifier 92 contained in the measuring circuit 90. Recapitulating, it is the function of the switch 62 and the potentiometer 72 to select an intermediate point representation of a defined system zero. As the transducer output signal becomes more positive than the defined zero, the counting wheels 134 advance to increase the registration; conversely, as the transducer output signal becomes more negative than the defined zero, the counting wheels 134 reverse to reduce the registration.

The charging path has already been traced hereinbefore. However, even though rather elementary, the voltage on the capacitor 98 is accurately described as $$e = \frac{1}{c} \int i \, dt$$

For the case where $i$ is a constant, that is, proportional to the input signal voltage, where the input signal is not changing, the foregoing equation simplifies to $e = kvt/c$, where $e$ equals the charge on the capacitor 98, $v$ equals the signal voltage at the input terminal 92a of the amplifier 92, $t$ equals the time since the beginning of current flow, $c$ equals the capacitance value of the capacitor, and $k$ represents a lumped constant of proportionality. Since $e$, the charge on the capacitor, can never exceed the firing threshold of the unijunction Q1, we may define it as constant. Since $c$ is also fixed, we may regroup the terms thusly $t = 1/k'v$ where $k'$ is a new lumped constant of proportionality. Furthermore, since $f = 1/t$; that is frequency is the reciprocal of cycle time, we can then show that $f = k'v$; that is, the frequency output of the measuring circuit 90 is precisely proportional to the signal input voltage.

Accordingly, the capacitor 98 is charged to a threshold level and then is discharged by reason of the action of the unijunction transistor Q1. It will be helpful at this stage to refer to the group of waveforms appearing in FIGS. 2A—2H. In FIG. 2A and the AC signal derived from the pickup device 26 appears as a series of spaced pulses 180. The pulse width extends over a time period designated $t_1$ and then there is a period $t_2$ when there are no pulses 180. It will be appreciated that the pulses, for the sake of simplicity, have been shown as square wave pulses but they may, quite obviously, be rounded. Nonetheless, it is important to appreciate that these pulses are utilized in the triggering of the multivibrator 148 from one conductive state to the other. The two states of the multivibrator 148 appear in FIG. 2B, being denoted by the reference numerals 182 and 183, respectively. The period represented by the conductive state 182 is for a time period $t_3$ and the other state 183 is for a period $t_4$. More specifically, the state indicated by the pulse 182 is for a predetermined time and then the multivibrator automatically returns to the state represented by the numeral 183 and does not resume the state 182 until another pulse 180 is forwarded from the pickup device 26. We will for the sake of convenience assume that the pulses 180 are at a predetermined rate, the rate as will presently appear, being rather slow compared to a rate described in connection with FIG. 2E. In other words, the belt 12 is considered to be moving relatively slow as graphically illustrated in FIG. 2A.

The chopper 170 does not divert or bypass any of the charging current from the amplifier 92 during the time periods represented by the pulse signals 182. It is when the multivibrator 148 after a predetermined time switches back to its state 183 that the chopper 170 is effective as far as its short circuiting or bypassing function is concerned. Hence, the capacitor 98 can be charged from whatever output is furnished from the amplifier 92 during the period $t_3$. For a given weight on the belt 12 the sawtooth configuration depicted in FIG. 2C is represented by two pulses 184a and a sufficient additional charge on the capacitor 98 resulting in a smaller pulse 184a'. For the sake of easy illustration and comparison it will be assumed that the pulse 184a' is exactly one-half the charge necessary to produce a third pulse 184a. In other words, in the specific situation, the capacitor 98 will have had time to reach its fully charged level or state twice but does not during the first period $t_3$ reach its fully charged level the third time, thus resulting in the two and one-half pulses that have been labeled 184a and 184a'. The two pulses 184a will be instrumental in producing two output pulses from the transformer 108 and it is these output pulses from the transformer that will be counted by the counter assembly 126. Of course, it is to be recognized that the one-half pulse represented by the reference numeral 184a' may be any fraction of a complete pulse 184a and also it should be appreciated that any specific number of pulses 184a, depending on the charging rate which in turn depends on the weight of material on the belt 12, may appear during the time period $t_3$. We have, for the sake of illustration as pointed out above, taken two and one-half pulses.

It is during the period $t_4$ that the charging current is diverted from the capacitor 98 by the chopper 170, no pulses being produced during this time period and hence no pulses being forwarded to the counter assembly 126 during this same interval. Yet, it is important to understand that the capacitor 98, being charged to one-half of its fully charged state, does not lose this charge but retains the charge and the charging level continues from this halfway point when the next time period $t_3$ starts. Under these assumed conditions, the same amount of charging current is directed to the capacitor 98 in each time period $t_3$. Hence, the charging of the capacitor 98 will resume during the second time period $t_3$ from the level at which it was stopped at the end of the first time period $t_3$. Consequently, as far as the second time period $t_3$ is concerned, there will be a completion of the charge that was started during the first time period $t_3$ and therefore the capacitor 98 will reach its fully charged state in half the time that it would if the capacitor 98 were charged from a completely uncharged state as illustrated in the first time period $t_3$ of FIG. 2C. Consequently, there will be three discharges of the capacitor 98 taking place during the second time period $t_3$ as is evidenced from the three large pulses 184a (no smaller pulses 184a') that appear in the second time period $t_3$.

Under these conditions, the third time period $t_3$ (only the early portion of which is shown) in FIG. 2C would be an exact replica of the first time period $t_3$.

Assuming that the speed of the conveyor belt 12 remains constant, this being the speed represented by the AC signal set forth in FIG. 2A, but that the amount of material passing over the scale 20 is twice that that was involved in connection with the derivation of the signal set forth in FIG. 2C, then the capacitor 98 will be charged twice as rapidly because the DC voltage signal, this voltage signal having a magnitude in proportion to the weight of the material as already explained, will be doubled. Hence, instead of the two and one-half sawtooth pulses 184a and 184a' during the time period $t_3$, there will be five such pulses because of the doubling action that occurs. These pulses have been designated by the reference numeral 184b in FIG. 2D. The net result is that the counter assembly 126 will now count five pulses rather than two pulses as it would in the FIG. 2C situation for the first time period $t_3$. Yet, as far as the second period $t_3$ is concerned, there will be five pulses produced for counting purposes in FIG. 2D, whereas there were three pulses produced in connection with the graphical information depicted in FIG. 2C. The total number of pulses will, it should be recognized, be twice that when considering the time periods $t_3$ in FIG. 2D as contrasted with the time periods $t_3$ in FIG. 2C. Consequently, the registration on the counter assembly 126 will thus be doubled to indicate twice the amount of material on the prescribed section of the conveyor belt 12.

Now, considering that the speed of the conveyor belt 12 doubles, there will be twice the number of pulses 180 produced to represent the doubling of the belt speed, for the frequency of the AC signal is proportional to the belt speed. Consequently, the number of pulses 180 appearing in FIG. 2E will be twice that for FIG. 2A. The time period for each pulse remains the same, this being represented by the letter $t_1$. However, the period between pulses is much shorter and has been indicated as $t_5$.

Figure 2B:
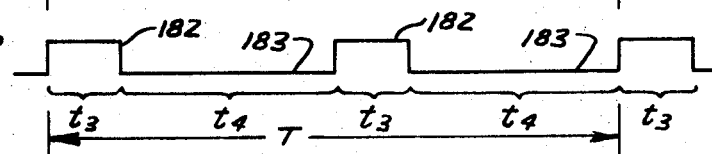
Figure 2C:
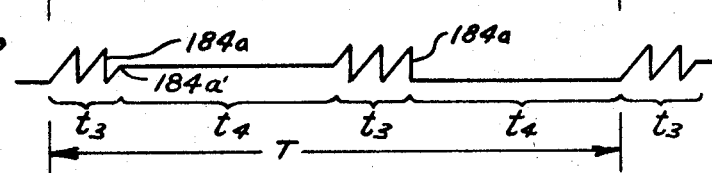
Figure 2D:
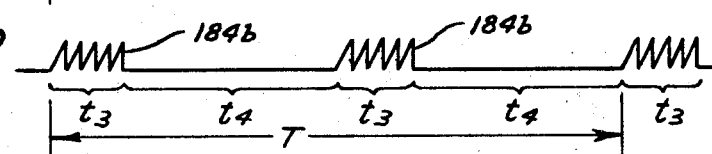
Figure 2E:
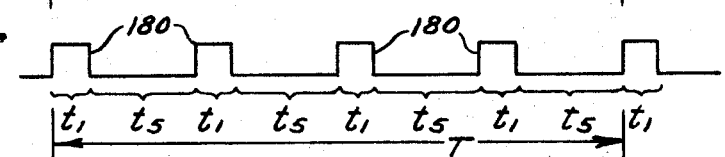
Figure 2F:
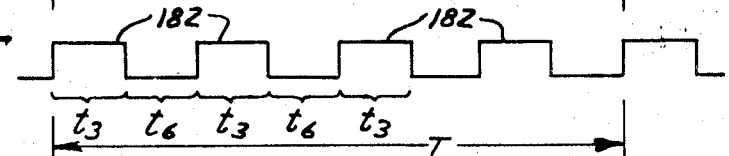

Since each time that a pulse 180 is directed to multivibrator 148, there is a switching of the conductive state of the multivibrator, there will now be twice as many pulses 182 in FIG. 2F as compared with FIG. 2B. The pulse duration in FIG. 2F is the same as far as the signals 182 are concerned, being designated as $t_3$. The time that the multivibrator remains in its switched state, though, has been shortened appreciably and is designated as the period $t_6$. Since the chopper 170 is effective only between pulse signals 182 to bypass the charging current to the capacitor 98, it will be perceived that the shorter period $t_6$ is representative of the period when the charging current is diverted from the capacitor 98. Assuming, though, that the instantaneous weight on the prescribed section of the conveyor belt 12 over the scale 20 is the same, this will result in twice as many periods $t_3$ and there will therefore be twice as many pulses 184a produced in the situation represented by FIG. 2G as compared with the situation represented by FIG. 2C. The number of pluses for each period $t_3$ remains the same but there are twice as many pulses produced because there are more time periods $t_3$.

Figure 2G:
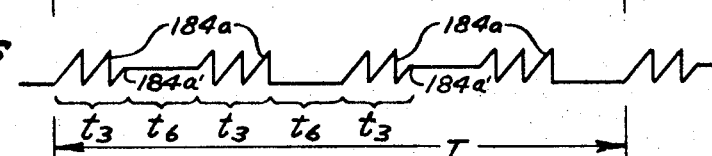
Figure 2H:
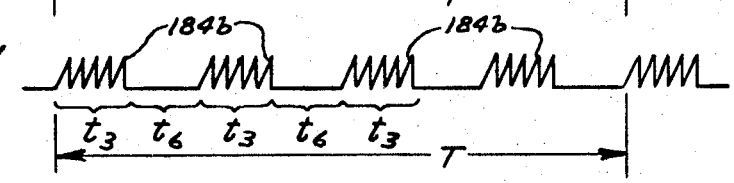

The graphical representation appearing in FIG. 2H should now be understood, for in this situation we assume that the conveyor belt 12 moves at the same speed that FIG. 2E represents but that the weight of material is doubled. Consequently, there is a doubling of the number of pulses for the total number of time periods $t_3$, these pulses being represented by the numeral 184b because they are the same as the pulses shown in FIG. 2D. It is important to appreciate that in the specific situation that has been adopted for illustrative purposes that there will be five pulses 184b for each time period $t_3$. More specifically, the capacitor 98 will be charged to its fullest extent five times and the fully charged condition will result in the production of an equal number of pulses that are forwarded to the counter assembly 126.

From the explanation given above, it will be discerned that a total time or period T can be selected during which any number of complete cycles take place as far as the AC signal obtained from the pickup device 26 is concerned. One complete cycle can be considered to begin with the start of one pulse 180 and to continue until the receipt of the next pulse 180. In FIG. 2A, one cycle would take place during the period $t_1+t_2$; in FIG. 2E, the period for one cycle would be shorter, that is, $t_1+t_5$. For the sake of simple illustration, a total time period T in FIG. 2A embraces two cycles and in FIG. 2E it covers four cycles. Consequently, in FIGS. 2C and 2D $$T = t_3+t_4+t_3+t_4$$
$$= 2(t_3+t_4)$$

and in FIGS. 2G and 2H $$T = t_3+t_6+t_3+t_6+t_3+t_6+t_3+t_6$$
$$= 4(t_3+t_6)$$

It should be clear that the pulse repetition rate as denoted by the sawtooth pulses 184a and 184b is proportional to the instantaneous weight of the material on the belt 12 as it passes over the scale 20. Also, it should be apparent that when the AC signal frequency derived from the pickup device 26 increases, then the periods during which charging current is diverted are decreased as far as their duration is concerned, reference being made to the shorter periods $t_6$ as compared to the longer periods $t_4$. The ratio of the time or period when pulses are permitted to flow to the counter assembly 126 to the total time T is indicative of or proportional to the belt speed. As far as the condition shown in FIGS. 2C and 2D is concerned, the ratio would be $2(t_3)/T$. The ratio representing the condition in FIGS. 2G and 2H would be $4(t_3)/T$.

Since the repetition rate or frequency of the pulses 184a or 184b is proportional to the instantaneous weight, while the incoming AC frequency determines the proportion of the time during which the pulses 184a or 184b are allowed to occur, it follows that the total number of pulses during each total time period T will be representative of the total quantity of material passing over the scale 20. In other words, the pulse registration on the counter assembly 126 will indicate the speed integral and may be determined at a glance. Although the above information should be readily comprehended, during the time period T, there will be five pulses counted for FIG. 2C, ten pulses for FIG. 2D, ten pulses for FIG. 2G and twenty pulses for FIG. 2H. This is, of course, on the assumption that the pulse divider circuit is not utilized. Any percentage of the pulses can be employed for operating the counter assembly 126.

Since the present invention accurately controls the duration of the pulse flow interval per unit cycle from the speed pickup device 26, as well as the pulse repetition rate or pulse frequency during the pulse flow periods, the following relationship holds true:

$$\text{Speed integral} = \frac{\text{pulse flow time}}{\text{total cycle time}} \times \text{pulse repetition rate}$$

It is believed that the waveforms portray with sufficient clarity the fact that the charge on the capacitor 98 is retained during the periods $t_4$ or $t_6$ when the charging current that would otherwise go to the capacitor 98 is being diverted by the chopper 170. The advantage to be obtained from the diode bridge 96 as far as its isolating function is concerned, should now be fully appreciated, for it is during these periods that the charge is fully retained on the capacitor 98. Hence, when the first time period $t_3$ for either FIGS. 2C or 2G is resumed, the charge progresses or continues from the level indicated by the reference numeral 184a' or more generally from whatever level it was at the termination of this particular period $t_3$. If, for example, the chopper conduction period $t_4$ starts just prior to a sawtooth 184a reaching its peak, when the period $t_3$ is resumed in the next time period $t_3$, the charging will continue from the point just beneath the peak and there will be a discharging of the capacitor 98 in a fraction of the time that it would take to fully charge the capacitor from a zero condition and an appreciably shorter time than it takes to fully charge the capacitor from the half charged level or pulse denoted by the reference numeral 184a' which is carried forward from the first time period $t_3$ in each of the FIGS. 2C and 2G to the succeeding time period $t_3$. This is of the utmost importance in providing a totalizer having an extreme degree of accuracy as is possible with the herein described invention.

I claim:

1. A totalizer for presenting a digital output representative of the product of two variables integrated with respect to time, one of said variables being represented by a direct current voltage signal having a value proportional to the magnitude thereof and the magnitude of the other of said variables being represented by an alternating current signal having a frequency proportional to the magnitude thereof, the totalizer comprising means for producing a flow of pulses having a repetition rate proportional to said one variable, means for interrupting the production of said pulses so that the ratio of the resulting pulse flow periods to the sum of said pulse flow periods and the resulting pulse non-flow periods is proportional to said other variable, a capacitor, said first means including an operational amplifier having its output in circuit with said capacitor for charging said capacitor in accordance with the magnitude of said direct current signal and said second means including a chopper for diverting charging current from said capacitor for time periods influenced by the frequency of said alternating current signal and additionally including a multivibrator for controlling said chopper, said multivibrator changing from one conductive state having a predetermined time duration to another having a time duration determined by the frequency of said alternating current to cause said chopper to divert charging current during the time that such multivibrator is in said other state and thereby allow charging of said capacitor during said predetermined times, and means for counting said pulses to provide a digital registration proportional to the time integral of the product of said two variables.

2. The totalizer set forth in claim 1 in which said registering means includes a pulse motor.

3. The totalizer set forth in claim 2 including dividing means for reducing the rate of pulses to said motor.

4. The totalizer set forth in claim 3 including means for charging said capacitor in the same direction when the output from said amplifier reverses polarity and including a reverse polarity relay for reversing said motor when said output is of opposite polarity.

5. A totalizer for providing a digital output representative of the product of two variables comprising means for providing a direct current signal having a magnitude proportional to the instantaneous magnitude of one of said variables, a capacitor, means including an operational amplifier for providing an output current derived from said direct current signal and the output current from said operational amplifier and normally feeding said output current to said capacitor to increase the charge thereon, means responsive to a predetermined level of charge on said capacitor for discharging said capacitor to produce an output pulse each time said capacitor is discharged whereby the resulting pulse repetition rate is proportional to the magnitude of said one variable, and means for causing the output current from said amplifier to bypass said capacitor at various intervals so that the ratio of the time periods that said output current is allowed to charge said capacitor to the total time during which said capacitor is both charged and bypassed is in accordance with the instantaneous magnitude of the other of said variables.

6. The totalizer set forth in claim 5 in which an alternating current signal having a frequency proportional to the magnitude of said second variable provides a time integral which is proportional to the product of said two variables.

7. The totalizer set forth in claim 5 in which an alternating current signal having a frequency proportional to the magnitude of said second variable represents said second variable, and said last-mentioned means includes a multivibrator which is triggered from one state to a second state for a predetermined period each time that an alternating current signal pulse is received, said last-mentioned means further including a chopper controlled by said multivibrator, said chopper being in a nonconductive state during each of said predetermined periods that said multivibrator is in its said predetermined periods that said multivibrator is in its said one state and conductive during the following period until another alternating signal pulse arrives so that said output current from said amplifier bypasses said capacitor during each of said following periods.

8. The totalizer as set forth in claim 7 including a conveyor having a scale for providing said direct current signal, said direct current signal thus being indicative of the instantaneous weight of material being delivered to said conveyor, said conveyor having a pickup device for providing said alternating current signal, said alternating current signal having a frequency proportional to the instantaneous speed of said conveyor.

9. A totalizer for presenting a digital output representative of the product of two variables integrated with respect to time, one of said variables being represented by a direct current voltage signal having a value in accordance with the magnitude thereof and the other of said variables being represented by an alternating current signal having a frequency in accordance with the magnitude of said second variable, the totalizer comprising a capacitor, means for supplying charging current to said capacitor irrespective of the polarity of said direct current voltage signal and at a rate determined by the value of said direct current voltage signal to produce a flow of pulses from said capacitor having a repetition rate in accordance with the magnitude of said one variable, means for interrupting the flow of charging current to said capacitor so that the ratio of the resulting pulse flow periods to the sum of said pulse flow periods and the resulting nonflow periods is in accordance with the magnitude of said other variable, means for counting said pulses to provide a digital registration that increases when said direct current signal is of one polarity and to provide a digital registration that decreases when said direct current signal is of an opposite polarity, whereby said digital registration is proportional to the time integral of the product of said two variables.

10. The totalizer set forth in claim 9 in which said counting means includes a pulse motor, and means responsive to the polarity of said direct current signal for reversing said motor when said direct current signal is of an opposite polarity.

11. The totalizer set forth in claim 10 in which said charging current supply means includes an operational amplifier having an output terminal for providing said charging current.

12. The totalizer set forth in claim 11 in which said polarity responsive means includes a relay energized when said output terminal changes from one polarity to an opposite polarity.

13. The totalizer set forth in claim 12 in which said charging current supply means includes a rectifying bridge connected between said output terminal and said capacitor to supply charging current to said capacitor irrespective of the voltage at said output terminal and hence irrespective of the polarity of said direct current voltage signal.

14. The totalizer set forth in claim 13 in which said interrupting means includes a chopper connected to said output terminal for diverting charging current from said capacitor to provide said nonflow periods.

15. A totalizer for presenting a digital output representative of the product of two variables integrated with respect to time, one of said variables being represented by a direct current voltage signal having a value in accordance with the magnitude thereof and the magnitude of the other of said variables being represented by an alternating current signal having a frequency in accordance with the magnitude thereof, the totalizer comprising a capacitor, means for producing a flow of pulses having a repetition rate in accordance with said one variable, said first means including an operational amplifier having its output in circuit with said capacitor for charging said capacitor in accordance with the magnitude of said direct current signal irrespective of the polarity of the output of said amplifier as determined by the polarity of said direct current voltage signal, second means for diverting charging current from said capacitor irrespective of the polarity of said output for time periods influenced by the frequency of said alternating current signal, and means for counting said pulses to provide a digital registration indicative of the time integral of the product of said two variables, said counting means increasing its registration when said output is of one polarity and decreasing its registration when said output is of an opposite polarity.

PO-1050
(5/69)

UNITED STATES PATENT OFFICE
CERTIFICATE OF CORRECTION

Patent No. 3,578,955              Dated May 18, 1971

Inventor(s) Gerald P. Kloven

It is certified that error appears in the above-identified patent and that said Letters Patent are hereby corrected as shown below:

Column 1, line 16, "wither" should be --either--. Column 3, line 2, after "68d" insert --68e--. Column 4, line 14, delete "15"; line 48, after "numeral" insert --116--; line 72, "ty" should be --by--. Column 5, line 6, after "reason" insert --of--. Column 9, line 74, delete "and". Column 11, line 57, "pluses" should be --pulses--. Column 14, lines 6 and 7, delete "predetermined periods that said multivibrator is in its said".

Signed and sealed this 12th day of October 1971.

(SEAL)
Attest:

EDWARD M. FLETCHER, JR.
Attesting Officer

ROBERT GOTTSCHALK
Acting Commissioner of Patents